Figure 1:
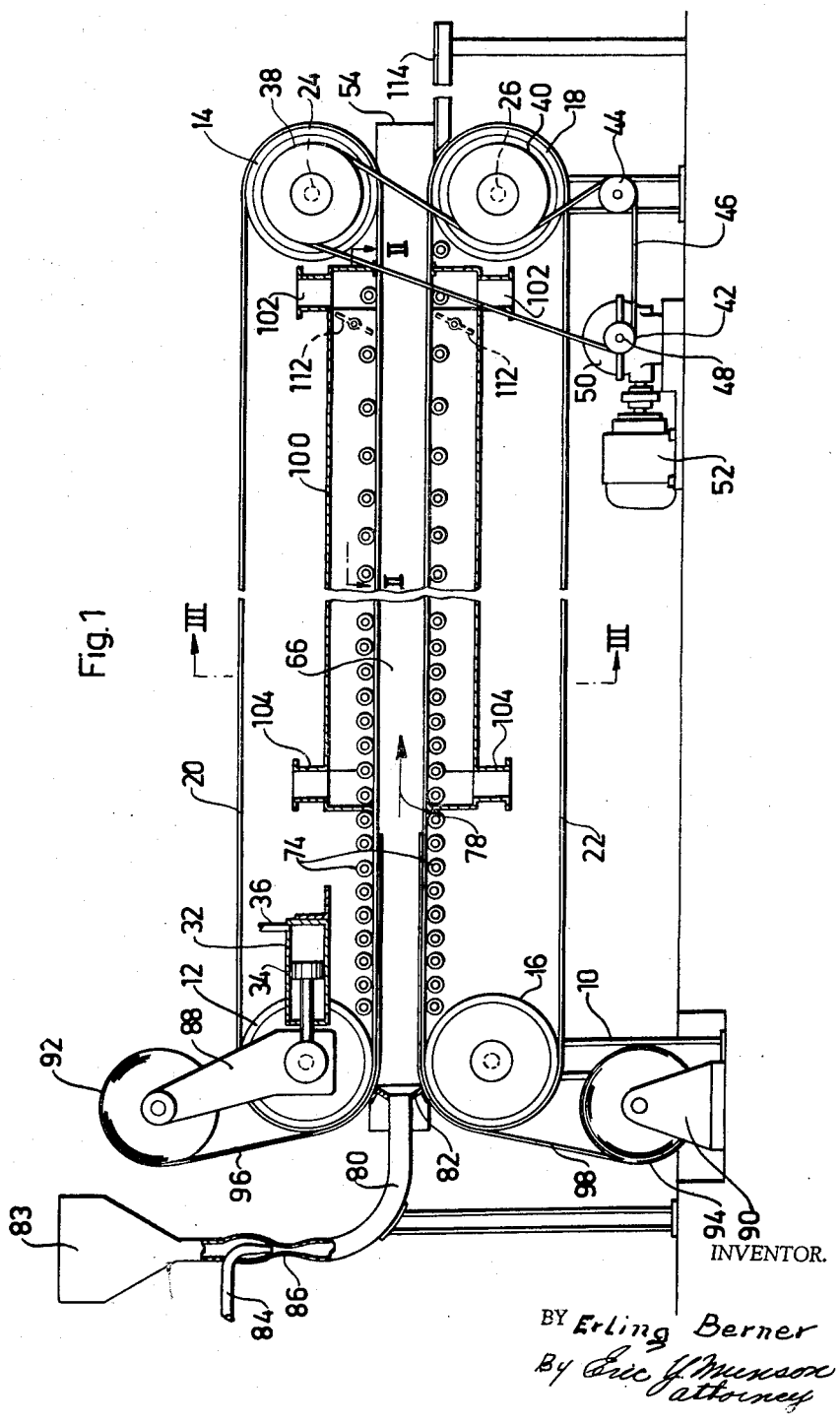

INVENTOR.
Erling Berner

United States Patent Office 3,065,500
Patented Nov. 27, 1962

3,065,500
METHOD AND APPARATUS FOR MAKING COHERENT BODIES FROM EXPANDABLE GRANULES OF THERMOPLASTIC
Erling Berner, New Castle, Pa., assignor to WMB International A.B., Stockholm, Sweden
Filed Dec. 11, 1959, Ser. No. 859,012
Claims priority, application Sweden Dec. 11, 1958
4 Claims. (Cl. 18—4)

This invention relates to the production of bodies from synthetic thermoplastic material. More particularly, the invention relates to a method of and means for the production of bodies intended for insulating purposes, beginning with grains or granules of synthetic thermoplastic material which initially may be expanded into a porous state and thereupon agglutinized into a coherent mass under the influence of heat. An example of such material is polystyrene to which is added an expanding agent such as petroleum ether. The starting material preferably consists of compact granules which, through expansion, are increased in volume by fifty times or more.

The invention includes a method and apparatus for the continuous production of the porous body, in connection with which pre-expanded granules are introduced into a channel defined by endless belts. The belts are perforated in order to permit the supply of steam to the granules whereby the granules are further expanded and at the same time are sintered together into a coherent mass while filling the cross-section of the channel, the coherent body being transported by the moving belts and moved thereby through a cooling zone before its emergence from the apparatus.

The invention further contemplates a method for such a continuous production of a coherent body which enables the body when located in the channel and between the movable walls thereof, to be provided with a coating or covering of paper, metal, or some other suitable material intended, for example, to reinforce the surface layer of the body. Bodies of this kind can, for example, be shaped into building panels or walls ready for mounting. The granules may be introduced into the channel through a conduit which has a smaller cross section than the channel, with the aid of a gaseous and preferably condensive medium, which transports the granules into the channel while the cross section of the channel is being filled, and also wholly or partly provides the heat required for the expansion and agglutinization of the granules. The gaseous medium, which preferably is steam, therefore has for its purpose the heating and expansion of the granules and the projection of the material against a wall of the granules which builds up between the belts. The granules may from the start, be either unexpanded or else expanded to a small degree and the effect of the steam on the granules is such that at least a substantial portion of the expansion occurs after the expansion by the steam has been effected, and the granules contact one another during the filling up of the cross-sectional area of the channel. The sintered granules migrate because of the movement of the belts during continued expansion in a direction toward the discharge. In the meantime, numbers of new granules result in a damming effect so that pressure is built up between the belts and the body resulting in the body acquiring its final, porous structure.

Figure 2:
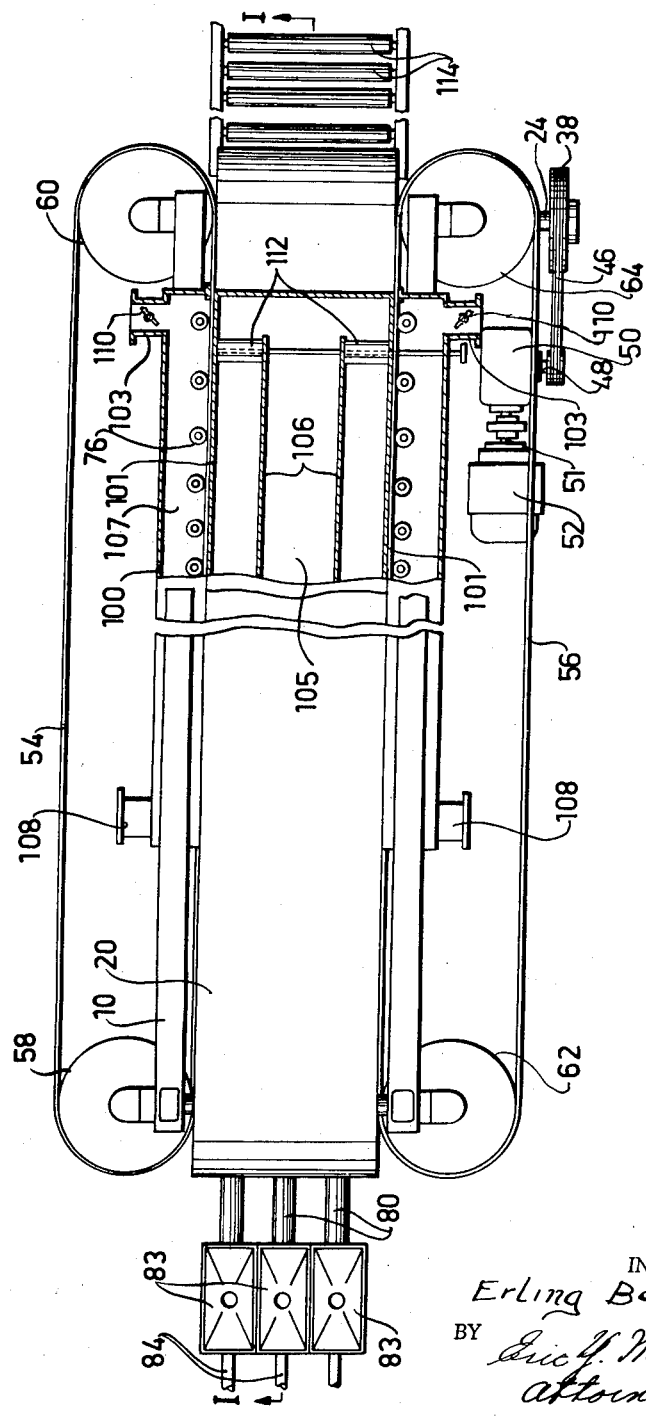
Figure 3:
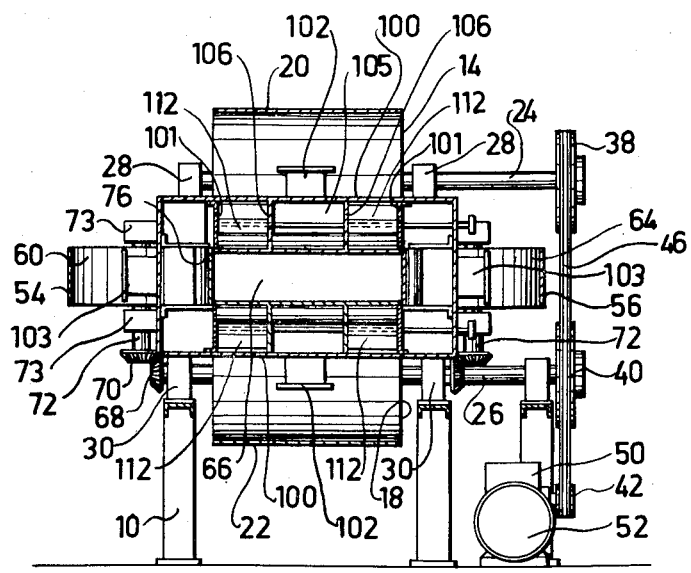

In the accompanying drawings, wherein an illustrative embodiment of the invention is disclosed, and in which FIG. 1 discloses an apparatus constructed in accordance with the invention, and constitutes a sectional view taken substantially on the line I—I of FIG. 2, looking in the direction of the arrows;

FIG. 2 is a sectional view, taken substantially on the line II—II of FIG. 1, looking in the direction of the arrows, and FIG. 3 is a sectional view, taken substantially on the line III—III of FIG. 1, looking in the direction of the arrows.

Referring to the drawings, 10 indicates the frame of the apparatus and in which are mounted the two rotative drums indicated at 12 and 14, and which constitute the upper drums, and located below said drums are the lower drums indicated respectively at 16 and 18. An endless steel belt 20 extends between the drums 12 and 14 while a similar belt 22 extends between the drums 16 and 18. As will be noted in FIG. 3, the drums 14 and 18 are mounted on horizontal shafts 24 and 26 which are rotatively supported in the bearings 28 and 30. The belt 20 can be tightened in any suitable manner, such as for example, by means of a pneumatic servo-motor that includes a cylinder 32, shown in FIG. 1, in which a piston 34 is operative under the effect of a fluid pressure medium introduced into the cylinder that has a conduit, a part of which is shown at 36. A similar device can be employed to tighten the lower belt 22.

On the shafts 24 and 26 are respectively mounted the pulleys 38 and 40 about which, and also around the pulleys 42 and 44, is arranged an endless transmission element, such as the belt 46. The pulley 42 is mounted on the outwardly extending shaft 48 of a gear box 50, the driven shaft 51 thereof being coupled to and driven by the motor 52.

On the opposite sides of the belts 20 and 22 are arranged two endless steel belts 54 and 56 which are supported by the rotative drums 58 and 60 respectively, the axles of which are vertically arranged. The belts 54 and 56 can be tightened by means of a device, such as that described in connection with the belt 20. The opposing surfaces of the four belts 20, 22, 54 and 56, arranged as above described, form a longitudinal channel 66 having a rectangular cross-section. The height of the channel 66 can be adjusted in a known manner to thereby produce panels of the porous material of varying thickness. The driving of the belts 20, 22, 54 and 56 is synchronized so that all of the belts are driven at the same speed and preferably from the same motor 52, the drive being effected for example, by means of the bevel gears 68 and 70 (FIG. 3), the gear 68 being mounted on the axle 26 and the gear 70 on the vertical axle 72, one of which is employed for the drum 60 and the other for the drum 64. The axles 72 are mounted in the bearings 73.

On the outside of those parts of the belts 20, 22, 54 and 56 which form the walls of the channel 66 are provided supporting supporting rollers 74 and 76 which function to insure proper positioning of those parts of the belts particularly when they are subjected to an outward working pressure. The walls of the channel 66 are moved in the direction of the arrow 78 in FIG. 1. At the entry end of the channel 66, or that shown at the left in FIG. 1, are several conduits, three in number being shown. Each of these conduits, indicated at 80, is preferably of a smaller cross-sectional size than the cross-sectional size of the channel 66. At this entrance end of the channel is a closure wall 82 in which the conduits are mounted and which forms a seal around the outlet ends of the conduits and between such ends and the belts. The conduits 80 are connected to a hopper 83 for the granular material. A steam pipe 84 connects with a constricted part 86 in each conduit 80 so that an ejector effect is produced and the steam emerging from pipe 84 into the conduit draws the granular material along with it from the hopper 83 as will be explained in further detail presently. The steam can have a pressure up to 10 atmospheres or higher and it may be saturated or superheated.

In the brackets shown at 88 and 90 are mounted two rolls shown respectively at 92 and 94 of a sheet material such as paper, cardboard, plastic material, metal plate or other material with which the porous body is to be covered and a web 96 from roll 92 and 98 from roll 94 is introduced into the channel 66 adjacent to the belts 20 and 22 in the manner clearly shown in FIG. 1.

It is important that the porous body be cooled before it leaves the channel 66. For this reason the greater part of the length of the channel is provided with a cooling device. This may consist of a box 100 which extends around the opposing wall portions of the several belts. The box 100 is suitably divided by means of partitions 101 into upper and lower compartments and two side compartments. Adjacent to one end the box is provided with inlets 102 and in its side walls with the inlets 103 for the entrance of a cooling medium such as air. The cooling medium is discharged through outlets 104 and 108 provided adjacent to the opposite end of the box. The box may have upper and lower partitions 106 which longitudinally divide the box to thereby provide a central zone 105 and two side zones 107. At the inlet end of the box are located vents, such as dampers 110 and 112 in the inlets 103 and in the side zones 107 and by means of which proportioning of the cooling air may be effected in such a manner that the central zone 105 receives more air than the side zones, thereby providing a higher degree of cooling per unit surface than is attained in the side zones 107 and the side compartments.

The operation of the described apparatus is substantially as follows:

The granular thermoplastic material is introduced into the hoppers 83. By steam leaving the steam pipes 84 the granules are conveyed at relatively high speed through the conduits 80 and are ejected therefrom into the channel 66 wherein the granules fill the cross-sectional area of the channel and thus build up into a wall which is constantly built up while the walls of the channel, as defined by the several belts, move in the direction of the arrow 78. Simultaneously, and while acting to convey the granules, the steam supplies at least a portion of the amount of heat required to expand the granules. The steam is condensed on the granules. In this manner, any previous pre-expansion can be concluded and the final agglutinization or sintering of the granules into a coherent body may be effected in a single step. As will appear from the foregoing, the steam pressure may be relatively high and the purpose thereof is to produce a sort of heat shock on the material with its rapid expansion following as a result. The volume of steam will thus be small while the speed in the ejector will be high. There should thus be a balance between the steam requirement for the feeding of the material and the amount of heat required for the expansion and sintering of the granules.

As herein mentioned, the granules may be introduced into the conduits 80 in entirely unexpanded form. However, when it is desired that full expansion of the granules be obtained, such as for example to the maximum of perhaps fifty times, pre-expansion of the granules before introduction into the channel might be desirable. Additional heat might also, if necessary, be supplied to the expanded granules in the channel with the aid of steam belts arranged around the channel.

The agglutinated hot body cools off during its continuous movement along in the channel 66 through that portion surrounded by the box 100. In this process the pressure exerted by the porous body on the belt will reduce gradually. By suitable adjustment of the dampers 110 and 112 the cooling of that portion of the porous body which is situated inside of the middle zone 105 can be intensified so that the porous body is cooled off in the best possible homogeneous manner. The finished product is conveyed out onto a table composed of the rollers 114 and may thereafter be divided into panel units of desired length.

The webs 96 and 98 of paper or other material as herein mentioned, are unwound from the rolls 92 and 94 and are inserted into the channel 66 between the belts 20 and 22 and the sealing wall 82. The webs follow these two bands and the expanded granular mass is built up and agglutinated under pressure against the webs. Thereafter the webs will be fixedly attached to the porous mass.

Having described an embodiment of the invention, it is obvious that the same is not to be restricted thereto, but is broad enough to cover all structures coming within the scope of the annexed claims.

What I claim is:

1. An apparatus for making coherent bodies from expandable granules of thermoplastic material comprising, a channel defined by a plurality of endless belts, means for moving said belts in the same direction, a granule conduit leading into the entrance end of the channel at one end of the belts, said conduit having a smaller cross-section than the cross section of the channel, a steam conduit entering into the granule conduit and through which steam under high pressure and of a temperature higher than the softening or melting temperature of the granules is forced, and ejection means operative in the granule conduit to thereby cause the steam to convey the granules without compressing the same into the channel and serve to partly supply the heat required for the expansion of the granules.

2. In an apparatus as provided for in claim 1, wherein a cooling chamber surrounds a portion of the channel, said chamber being divided in a manner to provide a greater cooling effect for the central portion of the body of the granules in the channel than it provides for the side portions thereof.

3. In an apparatus as provided for in claim 1, including means for supplying paper webs above and below the granules in the channel whereby the body formed of said granules will, upon emergence from the channel be provided with facings of such paper webs.

4. An apparatus for making coherent bodies from expandable granules of thermoplastic material comprising, a channel defined by a plurality of endless belts, means for moving the belts in the same direction, a cooling chamber arranged around a portion of the channel, said channel being longitudinally partitioned in a manner to divide it into a plurality of separate compartments to thereby provide a greater cooling effect for the central part of a body of granules in the channel than it provides for the side portions of said body, a granule conduit leading into the entrance end of the channel at one end of the belts, the granule conduit being smaller in cross section than the cross section of the channel, a steam conduit entering into the granule conduit and through which steam under high pressure and of a temperature higher than the softening or melting temperature of the granules is forced, the granule conduit having a constricted part located adjacent to an end of the steam conduit within the granule conduit to thereby result in an ejector effect to cause the steam to convey the granules into the channel while supplying the heat required for the expansion of the granules.

(References on following page)

References Cited in the file of this patent

UNITED STATES PATENTS

| | | |
|---|---|---|
| 1,751,624 | Du Brul | Mar. 25, 1930 |
| 2,200,262 | Daley et al. | May 14, 1940 |
| 2,207,822 | Rooney et al. | July 16, 1940 |
| 2,872,965 | Sisson | Feb. 10, 1959 |
| 2,929,793 | Hirsh | Mar. 22, 1960 |
| 2,962,407 | Aykanian | Nov. 29, 1960 |

FOREIGN PATENTS

| | | |
|---|---|---|
| 1,165,798 | France | June 2, 1958 |

OTHER REFERENCES

Plastics Technology, Fabrication Methods for Expandable Polystyrene, vol. 2, No. 7, July 1956, pp. 452–453.

Technical Manual-Dylite-Expandable Polystyrene: Mold Filling, chapter 3, Bulletin C–9–273, Nov. 15, 1959, Koppers Co.